(12) United States Patent
Li

(10) Patent No.: US 8,909,821 B2
(45) Date of Patent: Dec. 9, 2014

(54) SLIM-LINE CONNECTOR FOR SERIAL ATA INTERFACE THAT IS MOUNTED ON EXPANSION BAY OF COMPUTER INCLUDES DETECTION SIGNALS WHICH INDICATE CONNECTION STATUS AND TYPE OF DEVICE

(71) Applicant: Fujitsu Limited, Kawasaki (JP)

(72) Inventor: Minglong Li, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/094,268

(22) Filed: Dec. 2, 2013

(65) Prior Publication Data
US 2014/0173142 A1 Jun. 19, 2014

(30) Foreign Application Priority Data
Dec. 17, 2012 (JP) .................. 2012-274862

(51) Int. Cl.
  *G06F 11/30* (2006.01)
  *H01R 12/70* (2011.01)
(52) U.S. Cl.
  USPC .......... 710/17; 710/8; 710/9; 710/10; 710/15; 710/16; 710/18; 710/19; 710/72; 710/73; 710/74
(58) Field of Classification Search
  None
  See application file for complete search history.

(56) References Cited

U.S. PATENT DOCUMENTS

| 5,737,571 | A | 4/1998 | Fukuzumi |
| 7,179,096 | B2 * | 2/2007 | Dube et al. .................... 439/76.1 |
| 2012/0115371 | A1 * | 5/2012 | Chuang et al. ................ 439/660 |
| 2014/0136750 | A1 * | 5/2014 | Hershko et al. ............... 710/316 |

FOREIGN PATENT DOCUMENTS

| JP | 07-219629 A | 8/1995 |
| JP | 09-062583 A | 3/1997 |
| JP | 2006-243148 A | 9/2006 |

* cited by examiner

*Primary Examiner* — Tammara Peyton
(74) *Attorney, Agent, or Firm* — Maschoff Brennan

(57) ABSTRACT

An electronic device includes a function extension device that includes a first slim line connector based on SATA, and a terminal device connected to the function extension device. The terminal device includes a detection circuit for outputting a first and second detection signals which indicate whether connection to the function extension device is established and a type of the function extension device, respectively, a control circuit for detecting whether connection to the function extension device is established and for determination of the type of the function extension device by the first and second detection signals, and a second slim line connector based on SATA. The first and second detection signals are signals that passes through pins P1 and S4 of the second slim line connector, respectively, the function extension device connects a pin P1 with a pin S4 of the first slim line connector.

6 Claims, 11 Drawing Sheets

FIG. 4

| | PIN NAME | WHEN ODD (SATA DEVICE) IS USED | WHEN USB HUB (USB DEVICE) IS USED |
|---|---|---|---|
| SIGNAL SEGMENT | S1 | GND | |
| | S2 | SATA SIGNAL (TX+) | |
| | S3 | SATA SIGNAL (TX−) | |
| | S4 | GND | USB DEVICE DETECTION SIGNAL |
| | S5 | SATA SIGNAL (RX−) | |
| | S6 | SATA SIGNAL (RX+) | |
| | S7 | GND | USB SIGNAL (D+) |
| POWER SEGMENT | P1 | DEVICE DETECTION (Device Present: DP) | |
| | P2 | POWER SOURCE | POWER SOURCE |
| | P3 | POWER SOURCE | POWER SOURCE |
| | P4 | MD | USB SIGNAL (D−) |
| | P5 | GND | GND |
| | P6 | GND | GND |

FIG. 11

|  | DEVICE NOT CONNECTED | ODD CONNECTED | USB HUB CONNECTED |
|---|---|---|---|
| CD1 | H | L | H |
| CD2 | L | L | H |

SLIM-LINE CONNECTOR FOR SERIAL ATA INTERFACE THAT IS MOUNTED ON EXPANSION BAY OF COMPUTER INCLUDES DETECTION SIGNALS WHICH INDICATE CONNECTION STATUS AND TYPE OF DEVICE

CROSS-REFERENCE TO RELATED APPLICATION

This application is based upon and claims the benefit of priority of the prior Japanese Patent Application No. 2012-274862, filed on Dec. 17, 2012, the entire contents of which are incorporated herein by reference.

FIELD

The embodiments discussed herein are related to an electronic device and a connection detection method.

BACKGROUND

A slim line connector based on Serial ATA Revision 2.6 is mounted on an expansion bay of a notebook personal computer (PC). Such a slim line connector employs pin forms and a pin arrangement that are specific to a Serial Advanced Technology Attachment (SATA) interface (I/F).

A slim line connector has only one pin for identifying a device mounted on an expansion bay, which is a pin for detecting an existing device (for example, an optical disk drive (ODD)). In addition, since ground (GND) pins are arranged at both ends of a SATA signal line to protect high-speed communication from noise, there are no empty pins.

Thus, in order to identify a new device (a USB device, for example, a USB hub), a connector is changed or another connector is added, which results in mounting of a nonstandard connector. Such a description above is disclosed in, for example, Japanese Laid-open Patent Publication No. 2006-243148 and Japanese Laid-open Patent Publication No. 09-62583.

SUMMARY

According to an aspect of the invention, an electronic device includes a function extension device that includes a first slim line connector based on Serial Advanced Technology Attachment (SATA), and a terminal device configured to be connected to the function extension device. The terminal device includes a detection circuit configured to output a first detection signal and a second detection signal, the first and second detection signals indicating whether connection to the function extension device is established and a type of the function extension device, a control circuit configured to detect whether connection to the function extension device is established and to determine the type of the function extension device on the basis of the first detection signal and the second detection signal, and a second slim line connector based on SATA, wherein the first detection signal is a signal that passes through a pin P1 of the second slim line connector, the pin P1 being defined by SATA, the second detection signal is a signal that passes through a pin S4 of the second slim line connector, the pin S4 being defined by SATA, and the function extension device connects a pin P1 with a pin S4 of the first slim line connector, the pins P1 and S4 being defined by SATA.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating signal correspondences between pin names of a slim line connector, signals obtained when a SATA device is used, and signals obtained when a USB device is used;

FIG. 11 is a diagram illustrating states of a SATA detection signal and a USB detection signal.

DESCRIPTION OF EMBODIMENTS

Preliminary Considerations

However, the space where an expansion bay is mounted is small and the mounting of an additional connector is problematic due to the lack of space. In addition, when a nonstandard connector is used, there are issues in that compatibility is not maintained with earlier models and the manufacturing cost is increased.

It is assumed that, an existing GND pin for protection from noise or a pin for low-speed communication is switched, using a switch, to and from a pin for device identification. In a case where the existing GND pin for protection from noise or the pin for low-speed communication is used as the pin for device identification, since the length of a pin for device identification is long, for example, when a device is removed, the detection of removal of a device tends to be late. As a result, unauthorized access may occur while a device is being inserted or removed.

Accordingly, to embodiments discussed herein, a slim line connector based on SATA is used, the type of a function extension device is identified, and secure connection is realized.

Figure 1:
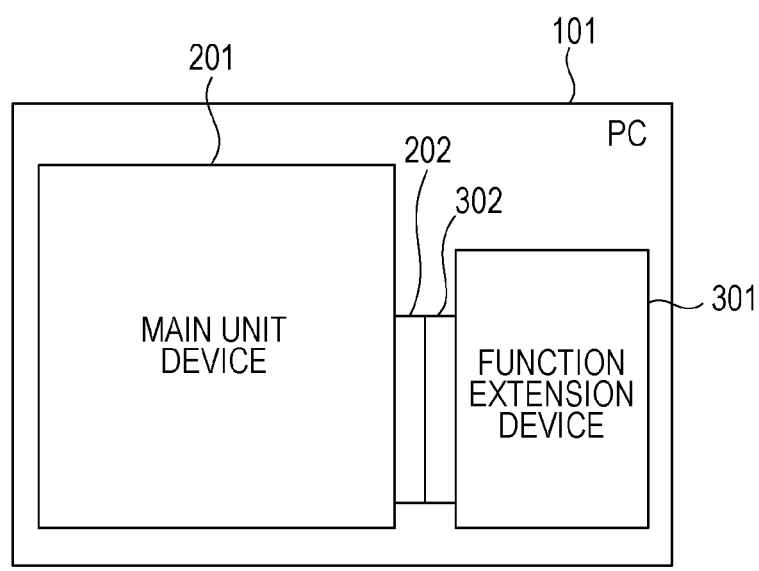
FIG. 1 is a diagram of the structure of a PC according to an embodiment.

Hereinafter, embodiments will be described with reference to the drawings. FIG. 1 is a diagram of the structure of a personal computer (PC) according to an embodiment. A PC 101 includes a main unit device 201 and a function extension device 301.

The PC 101 is an example of an electronic device. The PC 101 is, for example, a portable computer such as a notebook PC or a laptop computer. The main unit device 201 is an example of a terminal device. The main unit device 201 includes a central processing unit (CPU) and a memory, and performs various types of processing. In addition, the main unit device 201 includes a SATA controller and a USB controller, and controls the function extension device 301.

The main unit device 201 includes a slim line connector 202 based on SATA. Details of the slim line connector 202 are described in Serial ATA Revision 3.0.

The function extension device 301 is a device that extends the function of the PC 101. Examples of the function extension device 301 are SATA devices such as an optical disk drive (ODD) connected through a slimline SATA interface or Universal Serial Bus (USB) devices such as a USB hub connected through a USB interface.

The function extension device 301 is detachable from and attachable to an expansion bay of the PC 101, and is mounted on the expansion bay of the PC 101. The function extension device 301 includes a slim line connector 302 based on SATA. Data communication and power supply are performed between the main unit device 201 and the function extension device 301 by connecting the slim line connector 202 with the slim line connector 302.

Figure 2:
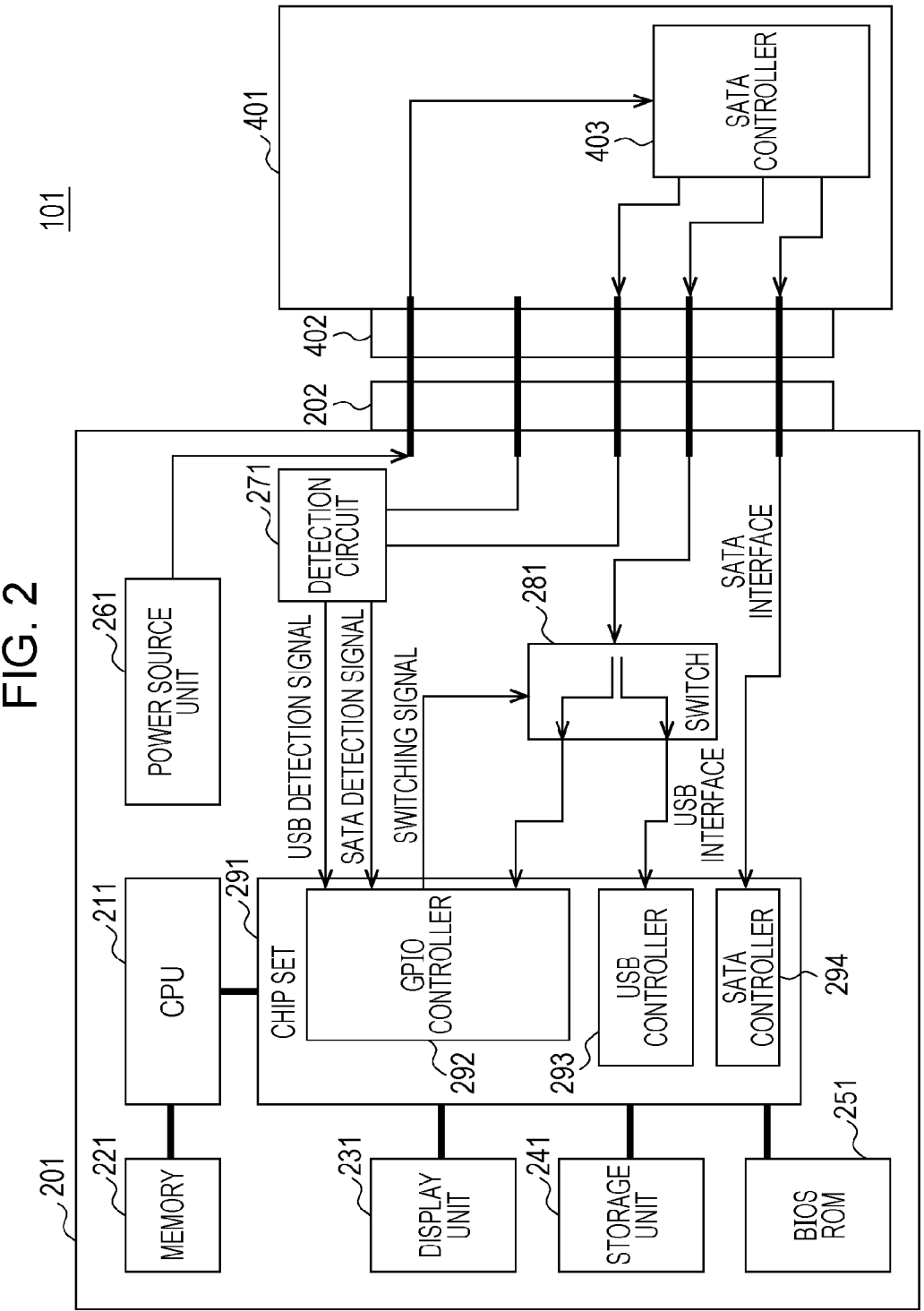
FIG. 2 is a diagram of the structure of a PC when an ODD according to an embodiment is connected.

FIG. 2 is a diagram of the structure of a PC when an ODD according to an embodiment is connected. With reference to FIG. 2, a case where an ODD is connected as a function extension device will be described. The PC 101 includes the main unit device 201 and an ODD 401.

The ODD 401 corresponds to the function extension device 301 in FIG. 1. The main unit device 201 includes the slim line connector 202, a CPU 211, a memory 221, a display unit 231, a storage unit 241, a basic input/output system (BIOS) read-only memory (ROM) 251, a power source unit 261, a detection circuit 271, a switch 281, and a chip set 291.

The slim line connector (a Slimline Host receptacle connector) 202 on a host side is a slim line connector based on SATA, and is connected to a slim line connector 402.

The CPU 211 is an arithmetic unit that performs various types of processing. The memory 221 is a storage device that temporarily stores data to be used by the PC 101. The memory 221 is, for example, a random-access memory (RAM).

The display unit 231 is a device that displays images. The display unit 231 is, for example, a liquid crystal display. The storage unit 241 is a device that stores data. The storage unit 241 is, for example, a hard disk drive (HDD) or a solid-state drive (SSD).

The BIOS ROM 251 is a ROM that stores a BIOS. The power source unit 261 is a device that supplies power to the main unit device 201 and the ODD 401.

The detection circuit 271 outputs a USB detection signal and a SATA detection signal indicating the type of a function extension device (a USB device or a SATA device) to a general purpose input/output (GPIO) controller 292. The level of the USB detection signal and that of the SATA detection signal become High or Low in accordance with the type of the function extension device.

The switch 281 is a semiconductor integrated circuit that changes an output destination of a signal supplied from the function extension device 301 either to the GPIO controller 292 or to a USB controller 293 in accordance with a switching signal. In the case where the function extension device 301 is the ODD 401, the switch 281 outputs a signal supplied from the ODD 401 to the GPIO controller 292. In addition, in the case where the function extension device 301 is a USB hub, the switch 281 outputs a signal supplied from the USB hub to the USB controller 293.

The chip set 291 is a semiconductor integrated circuit that has a plurality of controllers and a plurality of functions. The chip set 291 includes the GPIO controller 292, the USB controller 293, and a SATA controller.

The GPIO controller 292 determines a connection state or the type of a function extension device on the basis of a SATA detection signal and a USB detection signal, and outputs a switching signal that controls an output destination of the switch 281 on the basis of a determination result. Specifically, in the case where a SATA detection signal is High and a USB detection signal is Low, the GPIO controller 292 determines that the function extension device 301 is not connected. In the case where a SATA detection signal is Low and a USB detection signal is Low, the GPIO controller 292 determines that the function extension device 301 is a SATA device. In the case where a SATA detection signal is High and a USB detection signal is High, the GPIO controller 292 determines that the function extension device 301 is a USB device.

The USB controller 293 controls a USB device such as a USB hub. A SATA controller controls a SATA device such as the ODD 401. The ODD 401 is a SATA device, and includes the slim line connector 402 and a SATA controller 403.

The slim line connector (a Slimline Device plug connector) 402 on a device side is a slim line connector based on SATA and is connected to the slim line connector 202. The SATA controller 403 controls communication with the main unit device 201 and controls the ODD 401.

Figure 3:
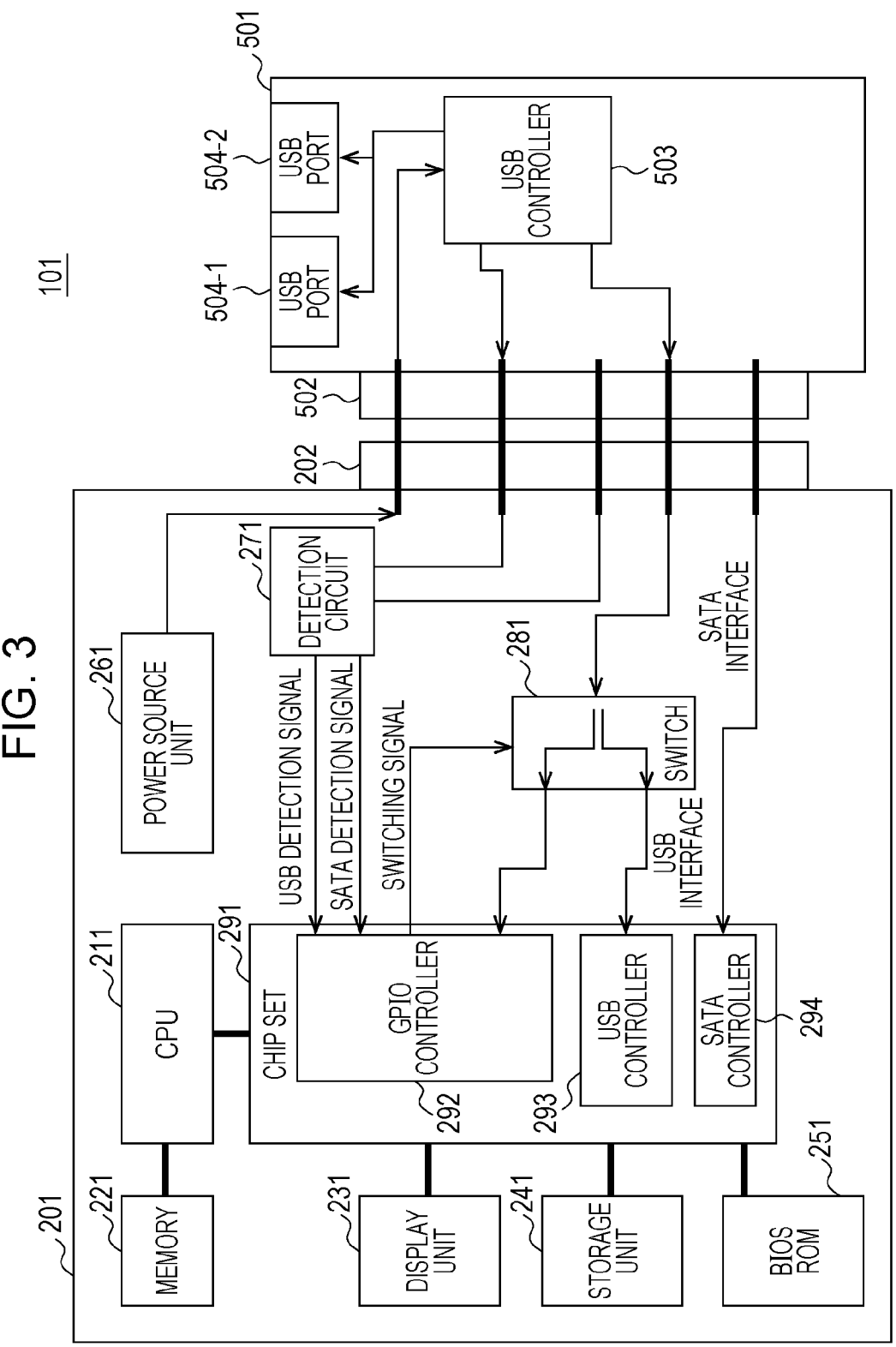
FIG. 3 is a diagram of the structure of a PC when a USB hub according to an embodiment is connected.

FIG. 3 is a diagram of the structure of a PC when a USB hub according to an embodiment is connected. With reference to FIG. 3, a case where a USB hub is connected as a function extension device will be described. The PC 101 includes the main unit device 201 and a USB hub 501.

The USB hub 501 corresponds to the function extension device 301 in FIG. 1. The description of the main unit device 201 will be omitted since the main unit device 201 has already been described with reference to FIG. 2. The USB hub 501 is a USB device, and includes a slim line connector 502, a USB controller 503, and USB ports 504-1 and 504-2.

The slim line connector (a Slimline Device plug connector) 502 on a device side is a slim line connector based on SATA, and is connected to the slim line connector 202. Note that the shape of the slim line connector 502 such as a pin arrangement and the length of pins is the same as that of a slim line connector based on SATA; however, the function of each pin of the slim line connector 502 is changed such that communication is possible through a USB interface. The PC 101 according to the embodiment is connected to a USB device using a standard slim line connector, and may use the USB device.

The USB controller 503 performs communication with the main unit device 201 and distributes data to the USB ports 504-1 and 504-2. The USB ports 504-1 and 504-2 are ports used to connect to USB devices (not illustrated) such as a USB mouse and a USB keyboard.

Here, a slim line connector will be described. The shape of a slim line connector, the number of pins that a slim line connector has, the name, length, and function of each pin, and the like are described in Serial ATA Revision 3.0.

FIG. 4 is a diagram illustrating signal correspondences between pin names of a slim line connector, signals obtained when a SATA device is used, and signals obtained when a USB device is used.

A slim line connector has seven pins S1 to S7 for a signal segment and six pins P1 to P6 for a power segment. The function of each pin of the slim line connector and a signal that passes through the pin of the slim line connector when a SATA device is connected will be described, and the function of each pin of the slim line connector and a signal that passes through the pin of the slim line connector when a USB device is connected will be described.

Details of the slim line connector when SATA device is used are followings:

The pins S1, S4, S7, P5, and P6 are connected to ground (GND). The pins S2, S3, S5, and S6 function as pins for serial signals TX+, TX−, RX−, and RX+, respectively. The pin P1 functions as a device detection (Device Present (DP)) pin. The pins P2 and P3 are connected to a power source (5V). The pin P4 functions as a Manufacturing Diagnostic (MD) pin.

Details of the slim line connector when USB device is used are followings:

The pins S1, S2, S3, S5, S6, and P1 are not connected (No Connect (NC) pins). The pins S7 and P4 are pins for USB signals D+ and D−, respectively. The pins P2 and P3 are connected to a power source (5V). The pins P5 and P6 are connected to ground (GND).

Figure 5:
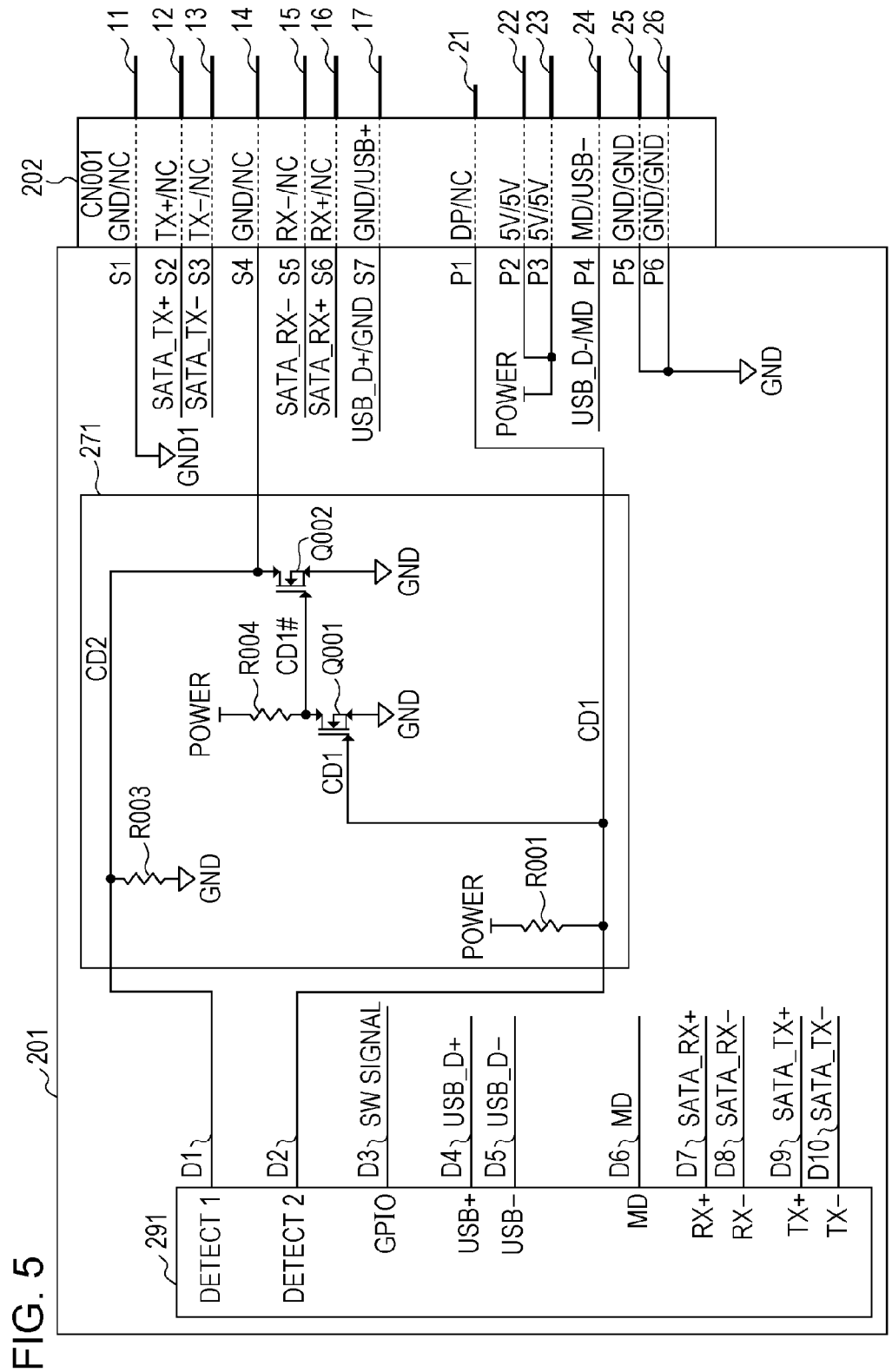
FIG. 5 is a diagram illustrating details of a chip set, a slim line connector, and a detection circuit according to an embodiment.

FIG. 5 is a diagram illustrating details of a chip set, a slim line connector, and a detection circuit according to an embodiment. With reference to FIG. 5, the slim line connector 202, the chip set 291, and the detection circuit 271 of the main unit device 201 will be described.

The chip set 291 has terminals D1 to D10. The terminal D1 is connected to the drain of a FET Q002 and a pin 14. A signal between the terminal D1 and the pin 14 is called a USB device detection signal CD2.

The terminal D2 is connected to a pin 21. A signal between the terminal D2 and the pin 21 is called a SATA detection signal CD1. The terminal D3 is connected to a terminal A7 of the switch 281. A switching signal (SW SIGNAL) is output from the terminal D3.

The terminal D4 is connected to a terminal A2 of the switch 281. The USB signal D+ is input to and output from the terminal D4. The terminal D5 is connected to a terminal A4 of the switch 281. The USB signal D− is input to and output from the terminal D5.

The terminal D6 is connected to a terminal A3 of the switch 281. The terminal D6 functions as a MD terminal. The terminal D7 is connected to a pin 16. The SATA signal RX+ is input to the terminal D7. The terminal D8 is connected to a pin 15. The SATA signal RX− is input to the terminal D8.

The terminal D9 is connected to a pin 12. The SATA signal TX+ is output from the terminal D9. The terminal D10 is connected to a pin 13. The SATA signal TX− is output from the terminal D10. Note that the terminals D1, D2, D3, and D6 are connected to the GPIO controller 292 of the chip set 291. The terminals D4 and D5 are connected to the USB controller 293 of the chip set 291. The terminals D7 to D10 are connected to a SATA controller 294 of the chip set 291.

The slim line connector 202 has a pin 11, the pins 12 to 16, a pin 17, the pin 21, and pins 22 to 26. The pins 11 to 17 and 21 to 26 correspond to the pins S1 to S7 and P1 to P6 in FIG. 4, respectively. Hereinafter, the pins 11 to 17 and 21 to 26 may also be represented as the pins S1 to S7 and P1 to P6, respectively.

The pin 11 is connected to GND. The pin 12 is connected to the terminal D9. The SATA signal TX+ is input to and output from the pin 12. The pin 13 is connected to the terminal D10. The SATA signal TX− is input to and output from the pin 13.

The pin 14 is connected to the terminal D1. The pin 15 is connected to the terminal D8. The SATA signal RX− is input to and output from the pin 15. The pin 16 is connected to the terminal D7. The SATA signal RX+ is input to and output from the pin 16.

The pin 17 is connected to a terminal A9 of the switch 281. The USB signal D+ is input to and output from the pin 17 when a USB device is connected, and the pin 17 is connected to GND when a SATA device is connected. The pin 21 is connected to the terminal D2.

The pins 22 and 23 are connected to the power source unit 261, and a voltage of 5V is applied to the pins 22 and 23. The pin 24 is connected to a terminal A8 of the switch 281. The USB signal D− is input to and output from the pin 24 when a USB device is connected, and the pin 24 functions as a MD pin when a SATA device is connected.

The pins 25 and 26 are connected to GND. The length of the pin 21 is shorter than that of each of the pins 11 to 17 and 22 to 26. Hereinafter, the pin 21 may also be represented as a short pin.

The length of each of the pins 11 to 17 and 22 to 26 is longer than that of the pin 21. Hereinafter, the pins 11 to 17 and 22 to 26 may also be represented as long pins. The detection circuit 271 includes resistors R001, R003, and R004 and field effect transistors (FET) Q001 and Q002.

One end of the resistor R001 is connected to the power source unit 261 and power is supplied to the resistor R001. The other end of the resistor R001 is connected between the terminal D2 and the pin 21. The resistance of the resistor R001 is 100 kΩ. The resistor R001 is a pull-up resistor. In the case where the function extension device 301 is not connected, the SATA detection signal CD1 is pulled up to High.

One end of the resistor R003 is connected to GND, and the other end of the resistor R003 is connected between the terminal D1 and the drain of the FET Q002. The resistance of the resistor R003 is 1 MΩ. The resistor R003 is a pull-down resistor. In the case where the function extension device 301 is not connected, the USB device detection signal CD2 is pulled down to Low.

One end of the resistor R004 is connected to the power source unit 261 and power is supplied to the resistor R004. The other end of the resistor R004 is connected to the drain of the FET Q001. The resistance of the resistor R004 is 1 KΩ. The drain, gate, and source of the FET Q001 are connected to the resistor R004, between the terminal D2 and the pin 21, and GND, respectively. The drain, gate, and source of the FET Q002 are connected to the terminal D1, the drain of the FET Q001, and GND, respectively. In addition, a signal input to the gate of the FET Q002 is called a control signal CD1#.

In the case where the SATA detection signal CD1 is High, the FET Q001 is closed, the control signal CD1# becomes Low, and the FET Q002 is opened. In the case where the SATA detection signal CD1 is Low, the FET Q001 is opened, the control signal CD1# becomes High, and the FET Q002 is closed.

Figure 6:
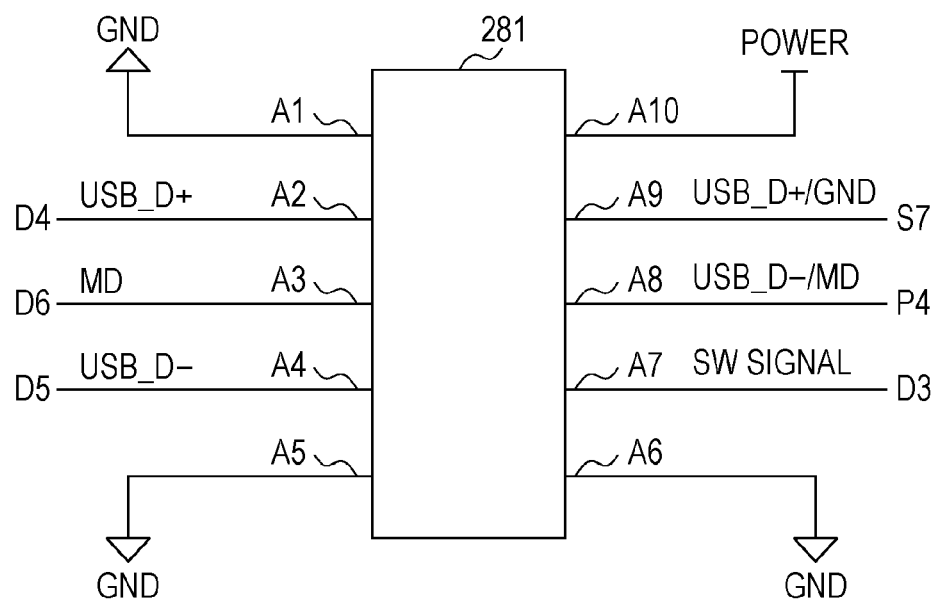
FIG. 6 is a diagram illustrating a switch according to an embodiment.

FIG. 6 is a diagram illustrating a switch according to an embodiment. The switch 281 has ten terminals: a terminal A1, the terminals A2 to A4, terminals A5 and A6, the terminals A7 to A9, and a terminal A10. The terminal A1 is connected to GND.

The terminal A2 is connected to the terminal D4 of the chip set 291. The USB signal D+ is input to and output from the terminal A2. The terminal A3 is connected to the terminal D6 of the chip set 291. The terminal A3 functions as a MD terminal.

The terminal A4 is connected to the terminal D5 of the chip set 291. The USB signal D− is input to and output from the terminal A4. The terminals A5 and A6 are connected to GND.

The terminal A7 is connected to the terminal D3 of the chip set 291. A switching signal (SW SIGNAL) is input to the terminal A7. The terminal A8 is connected to the pin P4 of the slim line connector 202. The USB signal D− is input to and output from the terminal A8 when a USB device is connected, and the terminal A8 functions as a MD terminal when a SATA device is connected.

The terminal A9 is connected to the pin S7 of the slim line connector 202. The USB signal D+ is input to and output from the terminal A9 when a USB device is connected, and the terminal A9 is connected to GND when a SATA device is connected. Power is supplied from the power source unit 261 to the terminal A10.

In the case where the switching signal (SW SIGNAL) input into the terminal A7 is High (that is, when a USB device is not detected), the switch 281 connects the terminal A1 with the terminal A9 and the terminal A8 with the terminal A3. In the case where the switching signal (SW SIGNAL) is Low (that is, when a USB device is detected), the switch 281 connects the terminal A2 with the terminal A9 and the terminal A4 with the terminal A8.

Figure 7:
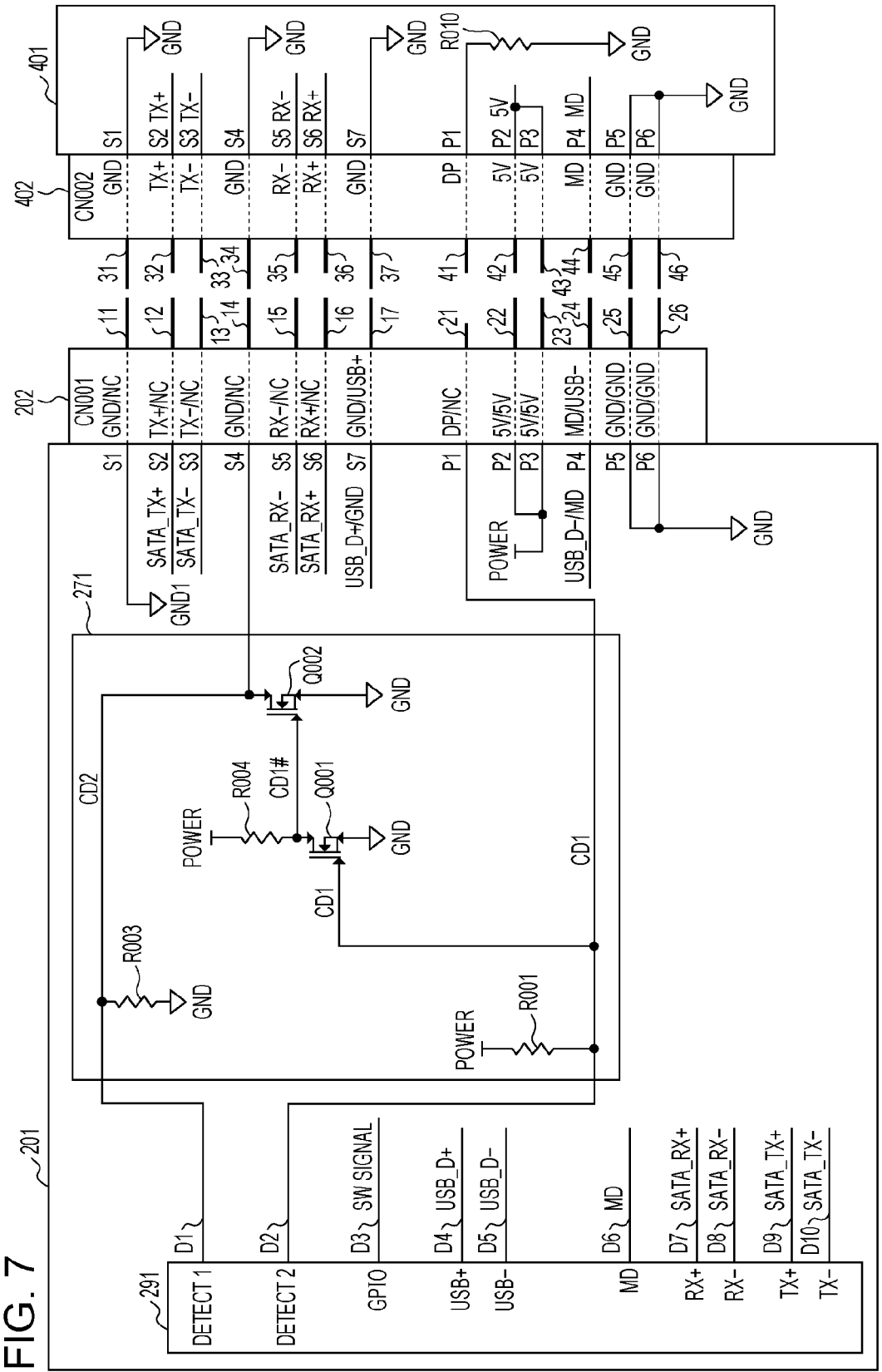
FIG. 7 is a diagram of a detailed structure of a PC when an ODD is connected according to an embodiment.

FIG. 7 is a diagram of a detailed structure of a PC when an ODD according to an embodiment is connected. Since the main unit device 201 has been described with reference to FIG. 5, the description of the main unit device 201 with reference to FIG. 7 will be omitted. The slim line connector 402 of the ODD 401 has pins 31 to 37 and 41 to 46.

The pins 31 to 37 and 41 to 46 correspond to the pins S1 to S7 and P1 to P6 in FIG. 4, respectively. Hereinafter, the pins 31 to 37 and 41 to 46 may also be represented as the pins S1 to S7 and P1 to P6, respectively. When the ODD 401 is connected, the pins 31 to 37 and 41 to 46 are connected to the pins 11 to 17 and 21 to 26, respectively.

Note that, in FIG. 7, a state in which the slim line connector 202 is not connected to the slim line connector 402 is illustrated in order to clearly illustrate the length of each of the pins 11 to 17, 21 to 26, 31 to 37, and 41 to 46.

In addition, hereinafter or in the drawings, the slim line connector 202 and the slim line connector 402 may also be denoted by CN001 and CN002, respectively. The pin 31 is connected to GND.

The pin 32 is connected to the SATA controller 403. The SATA signal TX+ is input to and output from the pin 32. The pin 33 is connected to the SATA controller 403. The SATA signal TX− is input to and output from the pin 33.

The pin 34 is connected to GND. The pin 35 is connected to the SATA controller 403. The SATA signal RX− is input to and output from the pin 35.

The pin 36 is connected to the SATA controller 403. The SATA signal RX+ is input to and output from the pin 36. The pin 37 is connected to GND.

The pin 41 is connected to GND via a resistor R010. Note that the resistance of the resistor R010 is 1 KΩ. The pin 41 functions as a DP pin. The pins 42 and 43 are connected to the SATA controller 403, and a voltage of 5V is applied to the pins 42 and 43.

The pin 44 is connected to the SATA controller 403. The pin 44 functions as a MD pin. The pins 45 and 46 are connected to GND. The length of each of the pins 32, 33, 35, 36, and 41 to 44 is shorter than that of each of the pins 31, 34, 37, 45, and 46. Hereinafter, the pins 32, 33, 35, 36, and 41 to 44 may also be represented as short pins.

The length of each of the pins 31, 34, 37, 45, and 46 is longer than that of each of the pins 32, 33, 35, 36, and 41 to 44. Hereinafter, the pins 31, 34, 37, 45, and 46 may also be represented as long pins.

In the case where the ODD 401 is not connected, the SATA detection signal CD1 is pulled up to High and the USB device detection signal CD2 is pulled down to Low. When the slim line connector 202 is connected to the slim line connector 402, the order in which pins are connected is as follows.

First, long pins of the slim line connector 202 are connected to the long pins of the slim line connector 402. That is, the pins 11, 14, 17, 25, and 26 are connected to the pins 31, 34, 37, 45, and 46, respectively.

Next, long pins of the slim line connector 202 are connected to short pins of the slim line connector 402. That is, the pins 12, 13, 15, 16, and 22 to 24 are connected to the pins 32, 33, 35, 36, and 42 to 44, respectively.

Then, the short pin of the slim line connector 202 is connected to a short pin of the slim line connector 402. That is, the pin 21 is connected to the pin 41. When the slim line connector 202 is connected to the slim line connector 402, since the pin 41 is connected to GND, the SATA detection signal CD1 becomes Low. In addition, since the pin 41 is connected to GND, the USB device detection signal CD2 remains Low. When the ODD 401 is connected, the pin 14 is connected to GND, and thus a signal may be protected from noise when high speed communication is performed, the pin 14 being positioned between the pin 13 and the pin 15, between which a serial signal is transmitted and received.

When the slim line connector 202 is disconnected from the slim line connector 402, the order in which pins are disconnected is as follows. First, the short pin of the slim line connector 202 is disconnected from a short pin of the slim line connector 402. That is, the pin 21 is disconnected from the pin 41.

Next, long pins of the slim line connector 202 are disconnected from short pins of the slim line connector 402. That is, the pins 12, 13, 15, 16, and 22 to 24 are disconnected from the pins 32, 33, 35, 36, and 42 to 44, respectively.

Then, long pins of the slim line connector 202 are disconnected from the long pins of the slim line connector 402. That is, the pins 11, 14, 17, 25, and 26 are disconnected from the pins 31, 34, 37, 45, and 46, respectively.

In this manner, when the slim line connector 202 is connected to the slim line connector 402, the pin 21 is connected to the pin 41 in the end, the SATA detection signal CD1 becomes Low, and the ODD 401 is detected. In addition, when the slim line connector 202 is disconnected from the slim line connector 402, first, the pin 21 is disconnected from the pin 41, the SATA detection signal CD1 becomes High, and the ODD 401 enters a state in which the ODD 401 is not detected.

That is, when the ODD 401 is inserted, after stable GND or stable power supply has been achieved, the ODD 401 is detected. When the ODD 401 is removed, unauthorized access tends not to occur by first making the ODD 401 enter the state in which the ODD 401 is not detected.

Figure 8:
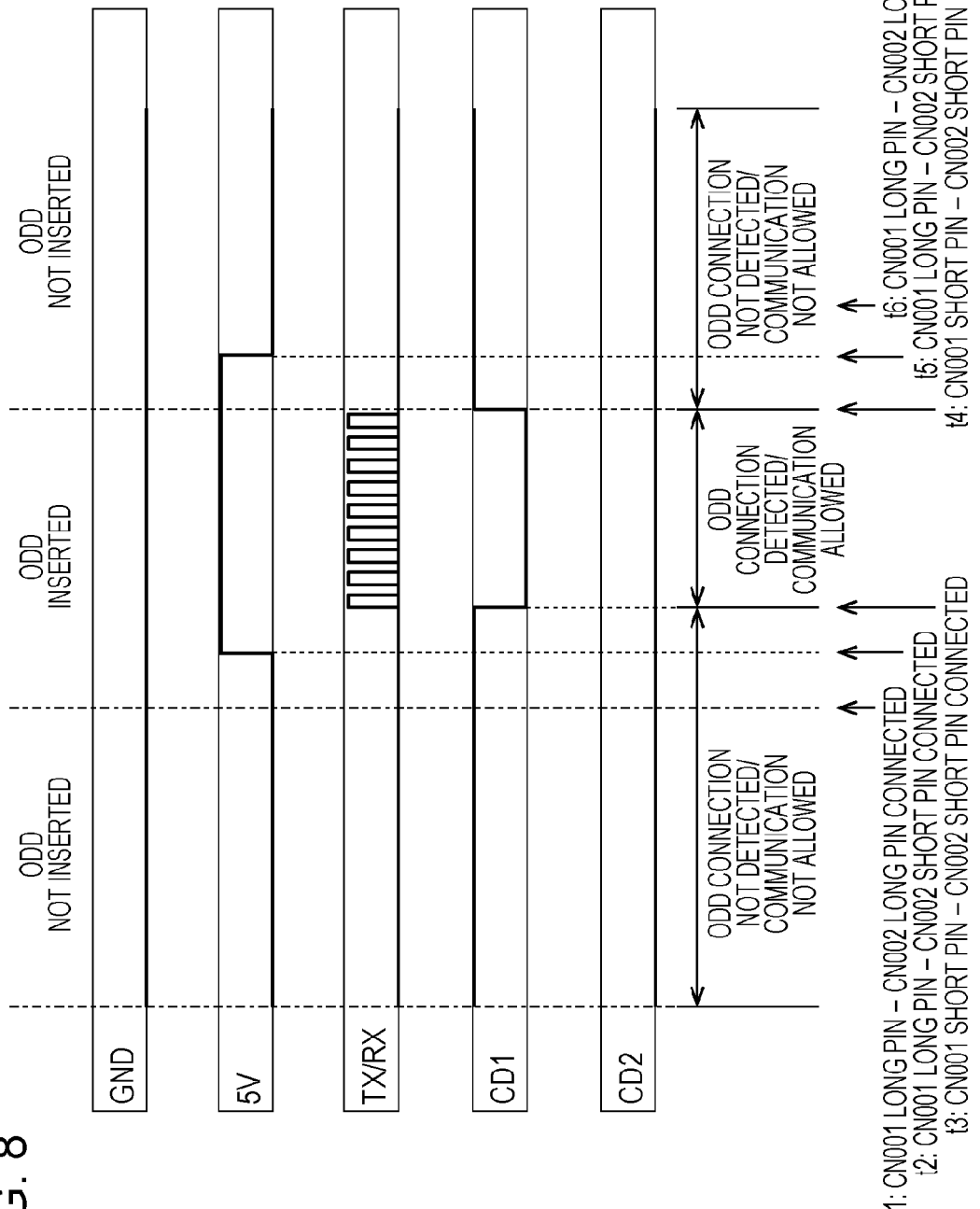
FIG. 8 is a time chart illustrating signals when an ODD is inserted or removed.

FIG. 8 is a time chart illustrating signals obtained when an ODD is inserted or removed. The time chart of FIG. 8 illustrates, from the top, GND (the pin 31), a power source 5V (the pins 42 and 43), the SATA signal TX/RX (the pins 32, 33, 35, and 36), the SATA detection signal CD1, and the USB device detection signal CD2.

At first, long pins of the slim line connector 202 are not connected to the slim line connector 402. First, inserting of the ODD 401 is started.

At time t1, long pins of the slim line connector 202 are connected to the long pins of the slim line connector 402. As a result, GND pins are contacted and stable GND is achieved.

At time t2, long pins of the slim line connector 202 are connected to short pins of the slim line connector 402. As a result, the pins 22 and 23 are connected to the pins 42 and 43, respectively, and power is supplied to the ODD 401. In addition, the pins 12, 13, 15, and 16 are connected to the pins 32, 33, 35, and 36, respectively. The chip set 291 is on standby so that SATA communication may be performed.

At time t3, the short pin of the slim line connector 202 is connected to a short pin of the slim line connector 402. That is, the pin 21 is connected to the pin 41, the SATA detection signal CD1 becomes Low, and the ODD 401 is detected. As a result, communication between the main unit device 201 and the ODD 401 is allowed, and the serial signal TX/RX is transmitted and received.

At time t4, removing of the ODD 401 is started. First, the short pin of the slim line connector 202 is disconnected from a short pin of the slim line connector 402. That is, the pin 21 is disconnected from the pin 41. As a result, the SATA detection signal CD1 becomes High, and the ODD 401 is not detected. The chip set 291 does not allow communication with the ODD 401.

At time t5, next, long pins of the slim line connector 202 are disconnected from short pins of the slim line connector 402. That is, the pins 12, 13, 15, 16, and 22 to 24 are disconnected from the pins 32, 33, 35, 36, and 42 to 44, respectively. As a result, power supply to the ODD 401 is stopped.

At time t6, long pins of the slim line connector 202 are disconnected from the long pins of the slim line connector 402. As a result, connection to GND is cut off.

Figure 9:
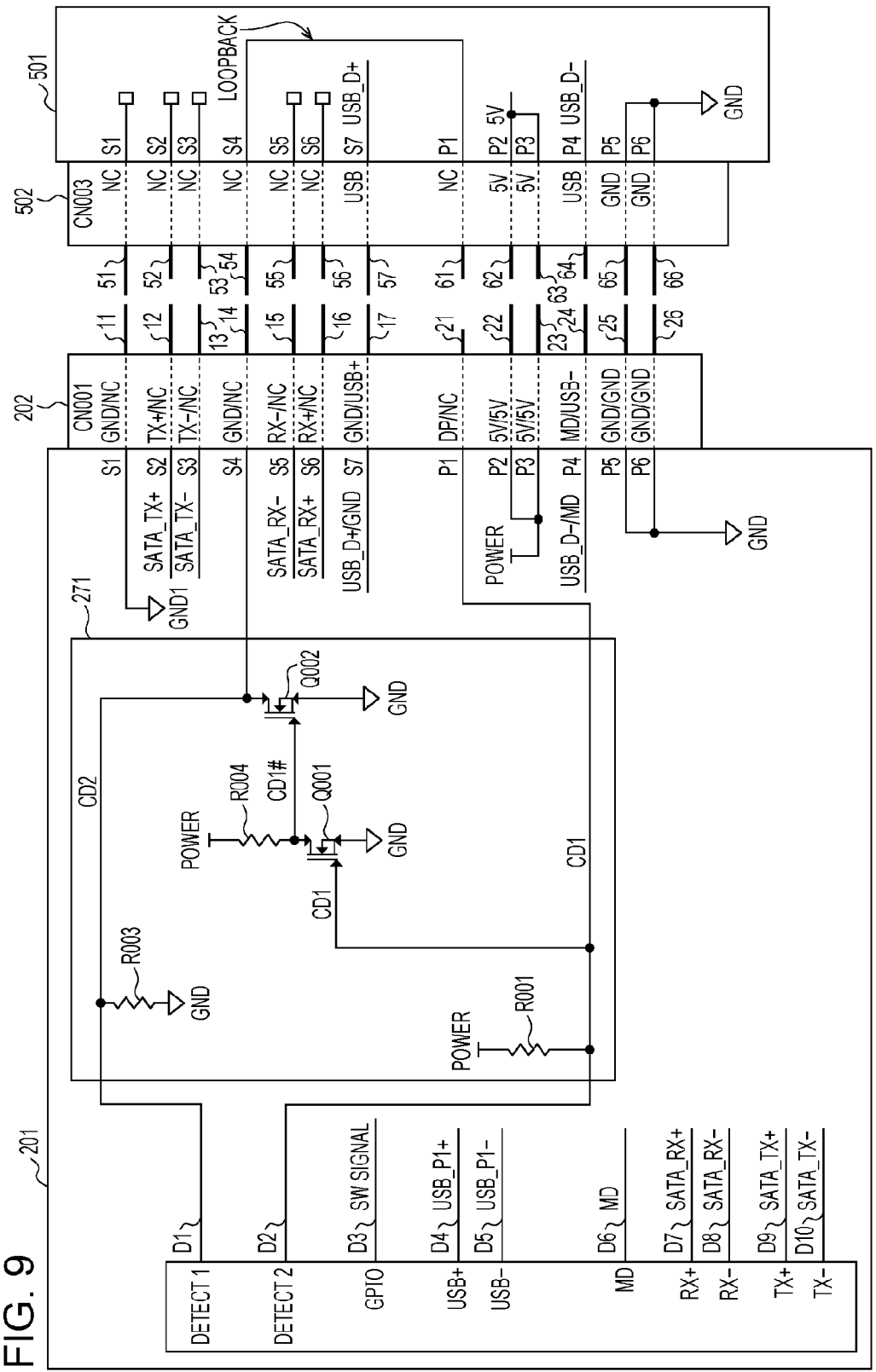
FIG. 9 is diagram of a detailed structure of a PC when a USB hub according to an embodiment is connected.

FIG. 9 is a diagram of a detailed structure of a PC when a USB hub according to an embodiment is connected. Since the main unit device 201 has been described with reference to FIG. 5, the description of the main unit device 201 with reference to FIG. 9 will be omitted. The slim line connector 502 of the USB hub 501 has pins 51 to 57 and 61 to 66.

The pins 51 to 57 and 61 to 66 correspond to the pins S1 to S7 and P1 to P6 in FIG. 4, respectively. Hereinafter, the pins 51 to 57 and 61 to 66 may also be represented as the pins S1 to S7 and P1 to P6, respectively. When the USB hub 501 is connected, the pins 51 to 57 and 61 to 66 are connected to the pins 11 to 17 and 21 to 26, respectively.

Note that, in FIG. 9, a state in which the slim line connector 202 is not connected to the slim line connector 502 is illustrated in order to clearly illustrate the length of each of the pins 11 to 17, 21 to 26, 51 to 57, and 61 to 66.

In addition, hereinafter or in the drawings, the slim line connector 202 and the slim line connector 502 may also be denoted by CN001 and CN003, respectively. The pins 51 to 53, 55, and 56 are No Connect (NC) pins.

The pin 54 is connected to the pin 61 in the USB hub 501. That is, there is a loopback. The pin 57 is connected to the USB controller 503. The USB signal D+ is input to and output from the pin 57.

The pins 62 and 63 are connected to the USB controller 503, and a voltage of 5V is applied to the pins 62 and 63. The pin 64 is connected to the USB controller 503. The USB signal D− is input to and output from the pin 64.

The pins 65 and 66 are connected to GND. The length of each of the pins 52, 53, 55, 56, and 61 to 64 is shorter than that of each of the pins 51, 54, 57, 65, and 66. Hereinafter, the pins 52, 53, 55, 56, and 61 to 64 may also be represented as short pins.

The length of each of the pins 51, 54, 57, 65, and 66 is longer than that of each of the pins 52, 53, 55, 56, and 61 to 64. Hereinafter, the pins 51, 54, 57, 65, and 66 may also be represented as long pins.

When the USB hub 501 is not connected, the SATA detection signal CD1 is pulled up to High and the USB device detection signal CD2 is pulled down to Low.

When the slim line connector 202 is connected to the slim line connector 502, the order in which pins are connected is as follows. First, long pins of the slim line connector 202 are connected to the long pins of the slim line connector 502. That is, the pins 11, 14, 17, 25, and 26 are connected to the pins 51, 54, 57, 65, and 66, respectively.

Next, long pins of the slim line connector 202 are connected to short pins of the slim line connector 502. That is, the pins 12, 13, 15, 16, and 22 to 24 are connected to the pins 52, 53, 55, 56, and 62 to 64, respectively.

Then, the short pin of the slim line connector 202 is connected to a short pin of the slim line connector 502. That is, the pin 21 is connected to the pin 61. When the slim line connector 202 is connected to the slim line connector 502, the pin 54 and the pin 61 are connected in the USB hub 501 and there is a loopback. Thus, the USB detection signal CD2 becomes High. In addition, the SATA detection signal CD1 remains High.

When the slim line connector 202 is disconnected from the slim line connector 502, the order in which pins are disconnected is as follows. First, the short pin of the slim line connector 202 is disconnected from a short pin of the slim line connector 502. That is, the pin 21 is disconnected from the pin 61.

Next, long pins of the slim line connector 202 are disconnected from short pins of the slim line connector 502. That is, the pins 12, 13, 15, 16, and 22 to 24 are disconnected from the pins 52, 53, 55, 56, and 62 to 64, respectively.

Then, long pins of the slim line connector 202 are disconnected from the long pins of the slim line connector 502. That is, the pins 11, 14, 17, 25, and 26 are disconnected from the pins 51, 54, 57, 65, and 66, respectively.

In this manner, when the slim line connector 202 is connected to the slim line connector 502, the pin 21 is connected to the pin 61 in the end, the USB detection signal CD2 becomes High, and the USB hub 501 is detected. In addition, when the slim line connector 202 is disconnected from the slim line connector 502, first, the pin 21 is disconnected from the pin 61, the USB detection signal CD2 becomes Low, and the USB hub 501 enters a state in which the USB hub 501 is not detected.

That is, when the USB hub 501 is inserted, after stable GND or stable power supply has been achieved, the USB hub 501 is detected. When the USB hub 501 is removed, unauthorized access tends not to occur by first making the USB hub 501 enter the state in which the USB hub 501 is not detected.

Figure 10:
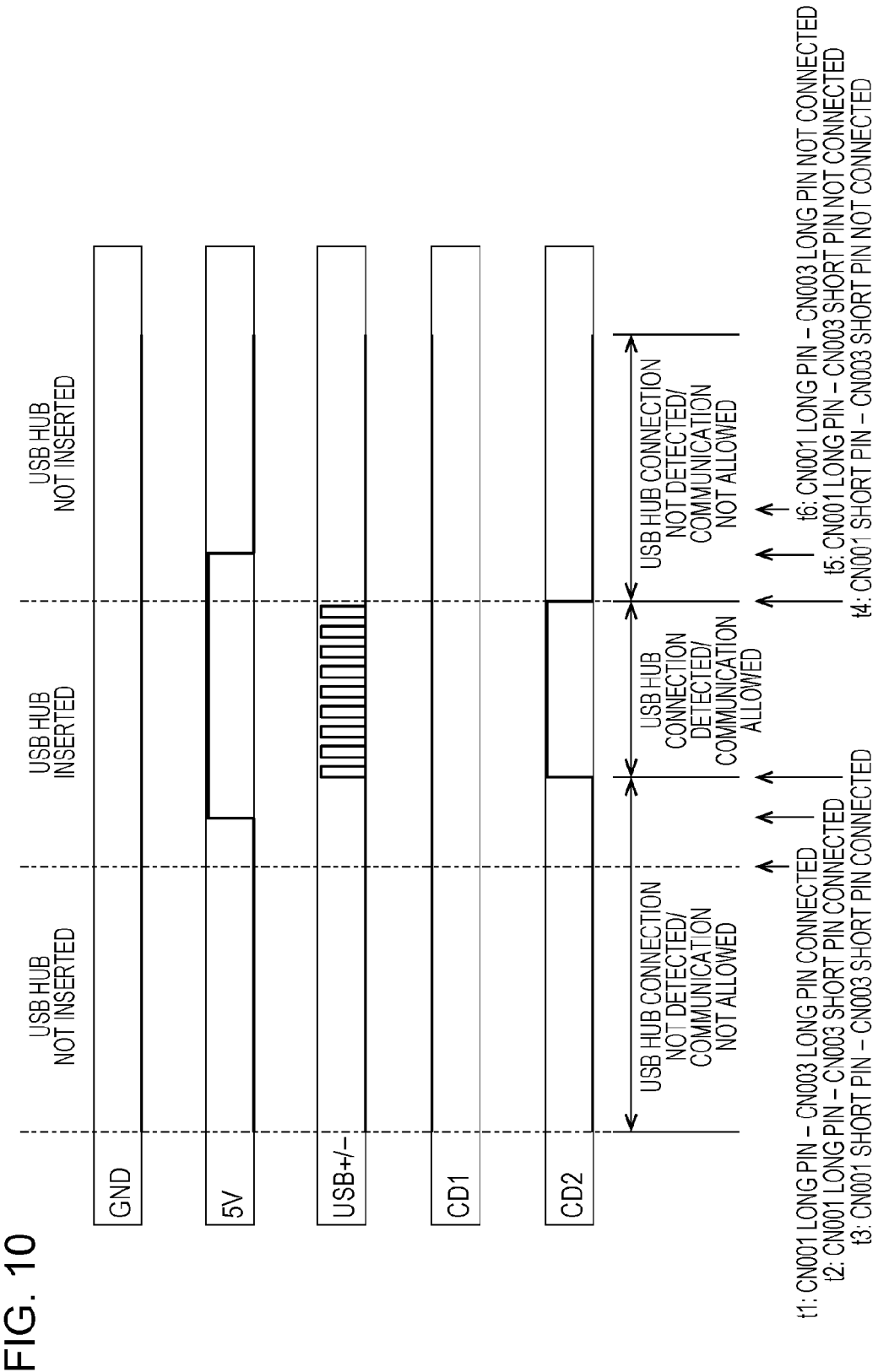
FIG. 10 is a time chart illustrating signals when a USB hub is inserted or removed.

FIG. 10 is a time chart illustrating signals obtained when a USB hub is inserted or removed. The time chart of FIG. 10 illustrates, from the top, GND (the pins 65 and 66), a power source 5V (the pins 62 and 63), the USB signal D+/D− (the pins 57 and 64), the SATA detection signal CD1, and the USB device detection signal CD2.

At first, long pins of the slim line connector 202 are not connected to the slim line connector 502. First, inserting of the USB device 501 is started. At time t1, long pins of the slim line connector 202 are connected to the long pins of the slim line connector 502. As a result, GND pins are contacted and stable GND is achieved.

At time t2, long pins of the slim line connector 202 are connected to short pins of the slim line connector 502. As a result, the pins 22 and 23 are connected to the pins 62 and 63, respectively, and power is supplied to the USB hub 501. In addition, the pins 17 and 24 are connected to the pins 57 and 64, respectively, and the chip set 291 is on standby so that communication through a USB interface may be performed.

At time t3, the short pin of the slim line connector 202 is connected to a short pin of the slim line connector 502. That is, the pin 21 is connected to the pin 61, the USB detection signal CD2 becomes High, and the USB hub 501 is detected. Accordingly, communication between the main unit device 201 and the USB hub 501 is allowed and the USB signal D+/D− is transmitted and received.

At time t4, removing of the USB hub 501 is started. First, the short pin of the slim line connector 202 is disconnected from a short pin of the slim line connector 502. That is, the pin 21 is disconnected from the pin 61. As a result, the USB detection signal CD2 becomes Low and the USB hub 501 is not detected. The chip set 291 does not allow communication with the USB hub 501.

At time t5, next, long pins of the slim line connector 202 are disconnected from short pins of the slim line connector 502. That is, the pins 12, 13, 15, 16, and 22 to 24 are disconnected from the pins 52, 53, 55, 56, and 62 to 64. As a result, supplying of power to the USB hub 501 is stopped.

At time t6, long pins of the slim line connector 202 are disconnected from the long pins of the slim line connector 502. As a result, connection to GND is cut off. FIG. 11 illustrates states of the SATA detection signal CD1 and the USB detection signal CD2 corresponding to connection states and types of the function extension device 301 described above.

In the case where the function extension device 301 is not connected, the SATA detection signal CD1 is High and the USB detection signal CD2 is Low. In the case where the ODD 401, that is, a SATA device is connected, the SATA detection signal CD1 is Low and the USB detection signal CD2 is Low.

In the case where the USB hub 501, that is, a USB device is connected, the SATA detection signal CD1 is High and the USB detection signal CD2 is High. A PC according to an embodiment may detect whether connection to a function extension device is established or identify the type of the function extension device using a slim line connector based on SATA. That is, a standard slim line connector is used, and thus the manufacturing cost tends not to increase.

In addition, according to a PC according to an embodiment, unauthorized access tends not to occur when a function extension device is being inserted or removed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device comprising:
   a function extension device that includes a first slim line connector based on Serial Advanced Technology Attachment; and
   a terminal device configured to be connected to the function extension device, the terminal device including,
   a detection circuit configured to output a first detection signal and a second detection signal, the first and second detection signals indicating whether connection to the function extension device is established and a type of the function extension device,
   a control circuit configured to detect whether connection to the function extension device is established and to determine the type of the function extension device on the basis of the first detection signal and the second detection signal, and
   a second slim line connector based on Serial Advanced Technology Attachment,
   wherein
   the first detection signal is a signal that passes through a pin P1 of the second slim line connector, the pin P1 being defined by Serial Advanced Technology Attachment,
   the second detection signal is a signal that passes through a pin S4 of the second slim line connector, the pin S4 being defined by Serial Advanced Technology Attachment, and
   the function extension device connects a pin P1 with a pin S4 of the first slim line connector, the pins P1 and S4 being defined by Serial Advanced Technology Attachment.

2. The electronic device according to claim 1, wherein
   the function extension device is a Universal Serial Bus device that performs communication through a USB interface and performs data communication with the terminal device using a pin S7 and a pin P4 of the first slim line connector, the pins S7 and P4 being defined by Serial Advanced Technology Attachment.

3. The electronic device according to claim 1, wherein
   the terminal device further includes a switch unit that is connected to a pin S7 and a pin P4 of the second slim line connector, the pins S7 and P4 being defined by Serial Advanced Technology Attachment, wherein
   the control circuit outputs a switching signal to the switch unit on the basis of a determination result, the determination result being indicative of the type of the function extension device, and
   the switch unit changes output destinations of signals from the pin S7 and the pin P4 of the second slim line connector in accordance with the switching signal.

4. A connection detection method for a terminal device that is connected to a function extension device and that includes a second slim line connector based on Serial Advanced Technology Attachment, the function extension device including a first slim line connector based on Serial Advanced Technology Attachment, the first slim line connector including a pin P1 and a pin S4 that are connected to each other, the pins P1 and S4 being defined by Serial Advanced Technology Attachment, the connection detection method comprising:
   checking a first and s second detection signals, the first detection signal being a signal that passes through a pin P1 of the second slim line connector, the second detection signal being a signal that passes through a pin S4 of the second slim line connector, the pins P1 and S4 being defined by Serial Advanced Technology Attachment; and
   detecting whether connection to the function extension device is established on the basis of the first detection signal and the second detection signal.

5. The connection detection method according to claim 4, wherein
   the function extension device is a Universal Serial Bus device that performs communication through a USB interface, and
   the connection detection method further comprising;
   performing data communication with the terminal device using pins S7 and P4 of the first slim line connector, the pins S7 and P4 being defined by Serial Advanced Technology Attachment.

6. The connection detection method according to claim 4, wherein
   the terminal device further includes a switch unit that is connected to a pin S7 and a pin P4 of the second slim line connector, the pins S7 and P4 being defined by Serial Advanced Technology Attachment, and the connection detection method further comprising:

determining a type of the function extension device on the basis of the first detection signal and the second detection signal;

outputting a switching signal to the switch unit on the basis of the determined type; and changing output destinations of signals from the pin S7 and the pin P4 of the second slim line connector in accordance with the switching signal.

* * * * *